March 31, 1970     B. VER NOOY     3,503,407
METHOD OF TAPPING A PIPELINE OR THE LIKE
Filed July 18, 1968     3 Sheets-Sheet 1
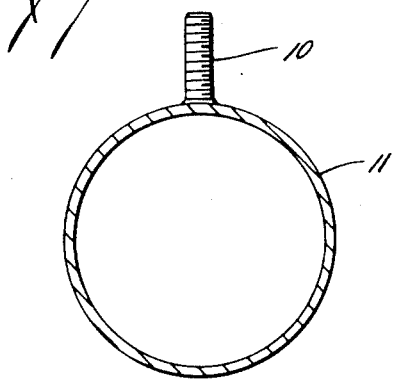
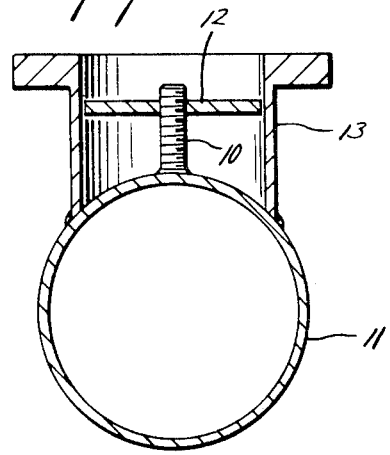
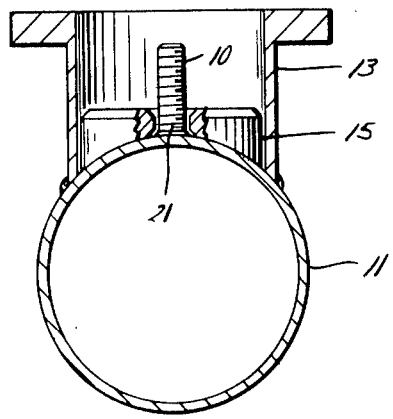
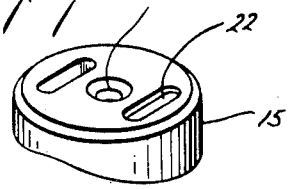
Burton Ver Nooy
INVENTOR.
BY
ATTORNEYS

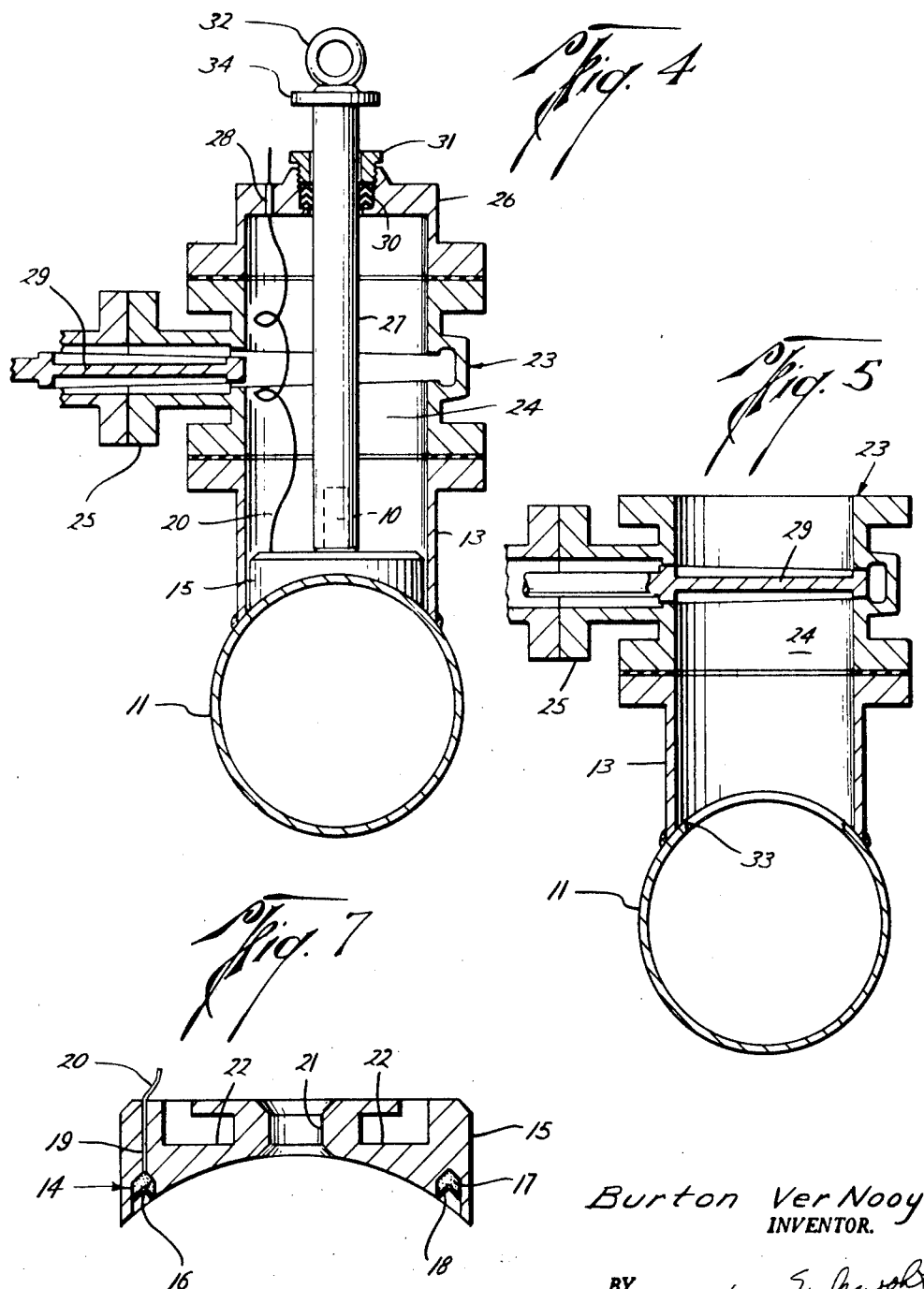

March 31, 1970  B. VER NOOY  3,503,407
METHOD OF TAPPING A PIPELINE OR THE LIKE
Filed July 18, 1968  3 Sheets-Sheet 3

Burton Ver Nooy
INVENTOR.

BY Browning, Hyer, Eickenroht & Thompson
ATTORNEYS

United States Patent Office 3,503,407
Patented Mar. 31, 1970

3,503,407
METHOD OF TAPPING A PIPELINE OR THE LIKE
Burton Ver Nooy, Tulsa, Okla., assignor to T. D. Williamson, Inc., Tulsa, Okla.
Filed July 18, 1968, Ser. No. 745,844
Int. Cl. F16l *41/04*
U.S. Cl. 137—15      20 Claims

ABSTRACT OF THE DISCLOSURE

In a method of hot tapping a pipeline or the like, a part is attached to the area of the pipeline to be tapped, and a saddle is arranged about the part to dispose a shaped charge carried by the saddle over and adjacent to such area. A housing is installed on the pipeline to enclose the shaped charge in fluid-tight relation, and a connection is established between the housing and the part attached to the pipeline. This part comprises a threaded stud, and the connection comprises a rod threaded at one end to the stud and sealably extending through the housing for reciprocation therein. The shaped charge is then detonated to cut a coupon from the area to be tapped, and the rod is actuated to withdraw the coupon and the saddle into a portion of the housing removed from such area. The saddle is guided onto the pipeline by aligning an opening through it with the stud attached to the pipeline. The housing is installed on a hollow support which is mounted on the pipeline in surrounding relation to such area to be tapped. In one form of such method, the support is welded to the pipeline, in which case the saddle is removed from within the support during the welding. In another form of the method, the hollow support comprises a portion of a split T which is secured about the pipeline, in which case the saddle may be in place over and adjacent the area of the pipeline to be tapped when the T is so secured.

---

This invention relates to a method of forming a side opening in a pressure vessel such as a pipeline or the like. More particularly, it relates to an improved method of forming such an opening without loss of pressure from the pipeline or other pressure vessel. The openings formed by this method are useful in the repair, maintenance and construction of pipelines, as well as in the measurement and sampling of fluid flowing therethrough.

It has heretofore been the practice to drill these openings with the rotary cutter of a conventional "hot tapping" machine. In such a machine, the cutter is carried by a boring bar which is mounted within a housing installed on the pipeline for rotary and reciprocable movement toward and away from the area of the pipeline to be tapped. Generally, the housing includes a valve which may be opened to admit the cutter and then closed upon its withdrawal to contain the line pressure as the remainder of the housing is removed therefrom. It is generally the practice to mount the housing, and particularly the valve, on a hollow member which also provides a support for the installation of other apparatus used in the operations aforementioned.

Because of the high power requirements of the cutter in drilling through the pipeline, these earlier tapping machines have been large and heavy. Thus, they are not only expensive to manufacture, but also expensive to inventory, particularly in any practical range of sizes. Furthermore, they are very difficult to handle in large sizes, and may require the use of auxiliary lifting equipment.

An object of this invention is to provide a method of hot tapping which does not have these high power requirements.

A further object is to provide a hot tapping method in which a coupon may be cut and then recovered from the pipeline without the need for the large and heavy power actuated tapping machines heretofore employed.

Another object is to provide a method of the type above described which may nevertheless be performed in short time and with equipment which is inexpensive and easy to operate.

A still further object is to provide a simple and inexpensive method of tapping openings of various sizes and shapes.

Other objects, advantages and features of this invention will be apparent to one skilled in the art upon consideration of the written specification, the attached claims, and the annexed drawings.

These and other objects are accomplished, in accordance with the illustrated method of the present invention, by the disposal of a shaped charge over and adjacent the area of the pipeline to be tapped and its subsequent detonation to cut a coupon therefrom. The charge is enclosed within a fluid-tight space provided by a housing installed on the line and, upon detonation of the charge to cut a coupon from said area, the coupon is withdrawn from the pipeline into the housing. More particularly, the coupon may be withdrawn into a portion of the housing which is isolated from the pipeline, as by means of a valve of the type above-described, to permit the coupon to be recovered. Alternatively, the coupon may be withdrawn into a portion of the housing so as to provide an unobstructed passageway between the pipeline and a conduit connected to the housing.

More particularly, a part is attached to the area of the pipeline to be tapped, and a connection is established between the part and the housing. When the coupon is cut from the pipeline, the connection is actuated to withdraw the coupon into housing, as above mentioned. The shaped charge is carried by a saddle which is arranged about such part to dispose the charge over and adjacent the area of the pipeline to be tapped. More particularly, in the preferred practice of the invention, the saddle is guided onto the pipeline by alignment of an opening through it with the part attached to the pipeline. In any event, the attaching part and saddle for the shaped charge are withdrawn with the coupon.

In the forms of the method illustrated in this application, the fluid-tight housing is installed on a hollow support which is mounted on the pipeline in surrounding relation to the area to be tapped. In one such method, this support comprises a nipple which is welded to the pipeline, and the housing is installed on such support when the saddle is arranged over and adjacent said area. However, in order to avoid the danger of prematurely detonating the charge, the saddle is removed from within the support as the support is welded to the pipeline. In another such method, this support comprises part of a split T which is secured about the pipeline. Since this does not require the welding of the support to the pipeline in the immediate area to be tapped, the saddle may be over and adjacent such area at the time the support is mounted on the pipeline.

Thus, in this latter form of method, the hollow support is guided onto the pipeline by the alignment of the hollow support with the saddle. On the other hand, in the first-mentioned method, the support member is guided onto the pipeline by a guiding member which is disposed about the part attached to the pipeline at the time such member is to be mounted and then removed from about the part to permit the saddle to be arranged thereabout after such member has been so mounted.

In the drawings, wherein like reference characters are used throughout to designate like parts:

FIG. 1 is a cross-sectional view of a pipeline to which a stud has been attached in accordance with the above-described methods;

FIG. 2 is a view similar to FIG. 1, but illustrating a subsequent step in the first described method wherein a hollow support member has been guided over a guiding member attached to the stud and welded to the pipeline in surrounding relation to the area thereof to be tapped;

FIG. 3 is a view similar to FIG. 2, but illustrating the further step in the first described method of guiding a saddle over the stud and into a position within the support over and adjacent the area of the pipeline area to be tapped;

FIG. 4 is a view similar to FIG. 3, but illustrating still further steps of the first described method in which a housing including a valve has been mounted above the support and a rod received within a fitting of the housing above the valve has been releasably attached to the stud;

FIG. 5 is a view similar to FIG. 4, but in which the shaped charge has been detonated to cut a coupon from the area of the pipeline to be tapped, the coupon has been raised by the rod into the housing, the valve has been closed to isolate the remainder of the housing from the pipeline, and the fitting and rod with the coupon attached have been removed from above the valve;

FIG. 6 is a perspective view of the top and side of the saddle;

FIG. 7 is a cross-sectional view on an enlarged scale of the saddle shown in FIG. 6 and illustrating the shaped charge carried within it;

Figure 8:
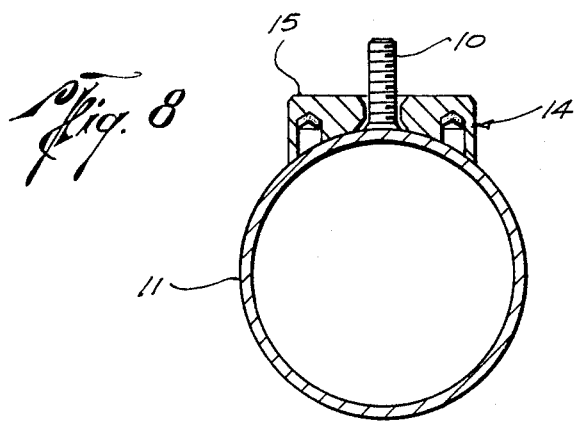
Figure 9:
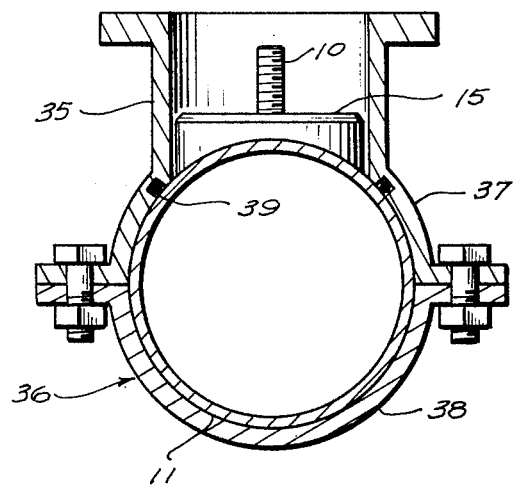

FIG. 8 is a cross-sectional view of a pipeline illustrating a step of the second described method wherein a saddle has been guided over the stud, as in the step of the first described method illustrated in FIG. 3; and FIG 9 is a view similar to FIG. 8, but illustrating a further step in the second described method in which a hollow support member of a split T has been guided over the saddle into mounted position on the pipeline and secured to the pipeline.

Turning now to a detailed description of these illustrated methods, a threaded stud 10 is first welded or otherwise attached at one end to the exterior of the pipeline 11 for extension radially outwardly with respect thereto, as shown in FIG. 1. More particularly, this stud is secured to a portion of the area of the pipeline which is to be tapped with its axis passing through a plane transverse to the axis of the pipeline. As will be understood from the description to follow, the free end of the stud 10 may be prepared other than by threading for connection with the remainder of the apparatus to be described.

In the first described method, and as shown in FIG. 2 a disc 12 is threaded onto the upper end of the stud 10 for guiding a tubular nipple 13 or other hollow support into position for seating on the pipeline at its lower end in surrounding relation to the area of the pipe to be tapped. More particularly, the disc 12 has an outer diameter adapted to fit closely within the support which, when seated, is welded to the pipeline. Although the disc, and thus the hollow support, are illustrated to be coaxial of the stud, they may be arranged eccentrically thereof in the guiding of the fitting into position in accordance with this invention. At any rate, when the disc has performed its guiding function, it is removed from the stud to prepare the support 13 to receive the shaped charge.

As best shown in FIG. 7, a shaped charge 14 is carried within an annular groove 16 on the lower side of a saddle-shaped member 15. This charge comprises a continuous ring 17 of explosive material which is contained at its lower end by means of a thin metal plate 18. Instead, the plate may completely surround the charge. In either event, the plate has an inverted V shape to direct the charge, upon detonation, downwardly through the open end of the groove, as well known in the art. For detonating purposes, a small opening 19 connects the upper end of the saddle 15 with the groove 16 to receive a fuse wire 20 as well as a blasting cap adjacent the ring 17 of explosive material.

There is an opening 21 formed centrally through the saddle 15 for disposal over the stud 10, as the saddle is lowered onto the area of the pipeline to be tapped. When, as illustrated, the saddle and shaped charge 14 carried thereby are arranged concentrically of the opening, this guided placement of the saddle will dispose the ring 17 of explosive material over and adjacent to the periphery of such area of the pipeline. Thus, upon detonation of the charge in a manner to be described, it cuts a coupon from the pipeline which has a diameter corresponding at least substantially to the mean diameter of the groove 16 and ring 17. As shown in FIG. 7, the upper side of the saddle 15 has lifting holes 22 or other means which may be grasped manually or attached to a suitable mechanism (not shown) for lowering it into position over the pipeline.

Inasmuch as the saddle 15 has an outer diameter substantially the same as that of disc 12, it may be used instead of the disc for guiding the hollow support 13. In this event, however, and for the reason previously mentioned, the saddle 15 is also removed prior to welding of the support to the pipeline.

As illustrated, the shaped charge 14 is annular to cut a circular coupon from the pipeline. Obviously, however, the charge may be otherwise formed for cutting differently shaped coupons. In fact, the saddle may carry two or more separate charges of any desired shape for cutting a corresponding number of coupons from the pipeline. Thus, the shape of the opening to be formed by this method is not limited, as a practical matter, to the circular cut made by the ordinary rotary cutting tool.

When the charge has been properly disposed on the pipeline, as shown in FIG. 3, a housing 23 is installed on the support 13 and thus on the pipeline to enclose the shaped charge 14 in a fluid-tight space 24, as shown in FIG. 4. More particularly, this housing 23 includes a valve 25 mounted on the support 13 and having a gate 29 adapted to be moved to open position to provide a tubular continuation thereof, and a fitting 26 mounted above the valve to close the upper end of the space 24. Preferably, the fitting receives a rod for connection at its lower end to the stud 10 for raising the coupon cut by the shaped charge into the housing, as will be described hereinafter. The fuse 20 extends within the space 24 and through an insulated sleeve 28 within the fitting 26 for connection to a suitable source of electrical current exteriorly of the housing.

The ends of the support 13, valve 25, and fitting 26 have flanges for sealed connection to one another, as by bolts (not shown). The valve and fitting may be connected to one another and then connected as a unit to the support; or, if desired, the valve may be connected to the support and the fitting then connected to the valve. Also, the rod 27 may be received by the fitting as the latter is installed; or, on the other hand, it may be so received after installation of the fitting. Still further, the lower end of the rod may be connected to the stem during, after, or prior to installation of the fitting 26.

The lower end of the rod 27 is connected to the stud pin, while its upper end extends through the fitting 26. More particularly, the rod is polished for sealably sliding through a packing 30 received within an opening through the upper end of the fitting 26 and a gland 31 threadedly connected to the fitting for compressing the packing. The upper end of this rod has an eye 32 or other suitable means for manipulation to raise and lower same within the housing. Thus, when the housing is installed and the rod and stud are connected together, they establish a connection between the area of the pipeline to be tapped and the housing which enables the coupon cut from the pipeline to be recovered therefrom in the manner described below.

When the parts have thus been assembled as shown in FIG. 4, the shaped charge is detonated by means of fuse 20 to cut a coupon from the pipeline of a size indicated by the opening 33 therein (FIG. 5). Although the slidable rod 27 permits the coupon and saddle to move radially into the pipeline a distance determined by the annular shoulder 33 formed thereon, it prevents them from flowing laterally or axially into the pipeline. The eye 32 of the rod is then grasped and pulled upwardly to withdraw the coupon from the pipeline and into the chamber 24 in the housing above gate 29. Upon closing of the valve gate 29, as shown in FIG. 5, the pipeline is isolated from the upper end of the chamber in which the coupon is disposed so that the fitting 26, as well as the rod 27, shaped charge 14, and coupon (not shown) carried thereon, may be removed from above the valve 25 without loss of pressure from the line.

Upon disconnection of the rod 27 from the stud 10, the rod and fitting 26 are free for use in a subsequent tapping operation. Although the support 13 and valve 25 remain in place, they provide, as in prior hot tapping methods, a means by which other apparatus may be installed on the line for the purpose of repairing, maintaining and constructing it.

In the second described method, as in the first described method, the opening 21 through the saddle 15 fits closely over the threaded stud 10 so as to guide the saddle and thus the shaped charge carried by it into the desired position over and adjacent to pipeline. However, as illustrated in FIG. 8, the saddle is so arranged on the pipeline prior to mounting of a hollow support 35 on the pipeline.

Thus, the hollow support 35 used in the second described method forms part of a split T 36 adapted to be secured about the pipeline 11 in a well known manner. As shown in FIG. 9, the T 36 includes an upper semi-cylindrical member 37 from which the hollow support 35 extends and a lower hemispherical member 38 adapted to encompass the remaining half of the pipeline. The adjacent end faces of the parts 37 and 38 are flanged and bolted to one another in a well known manner to secure the T to the pipeline.

An O-ring 39 is carried by the member 37 for sealing about the area to be tapped when the T is so secured. Also, the hollow support 35 is similar to the nipple 13 used in the first described method in that it is provided with a flange at its upper end to permit a housing to be installed thereabove.

Thus, as will be obvious from FIG. 9, the upper member 37 of the split T 36 may be moved into place on the pipeline so as to mount the hollow support 35 thereof in surrounding relation to the area to be tapped. More particularly, the inner diameter of the hollow support is guided over the slightly smaller outer diameter of the saddle 15. When the lower hemispherical member 38 of the split T is moved into place about the lower half of the pipeline, the two members may be secured together as previously described.

At this time, the further steps described in connection with FIGS. 4 and 5 of the first described method may be carried out so as to complete the hot tapping operation. That is, the housing 23 shown in FIG. 4 may be installed on the support 35 to enclose the shaped charge in a fluid-tight space defined by the interior of the housing, the interior of the hollow support 35, and the outer diameter of the pipeline area to be tapped. Then, when the housing is so installed and the rod 27 is connected to the threaded stud 10 to establish connection between the stud and the housing, the shaped charge is detonated to cut a coupon from the pipeline. The rod may then be lifted to withdraw the coupon and the saddle for the shaped charge from the pipeline and into the chamber in the housing above the gate 29. As in the first described method, upon closing of the valve to isolate the pipeline from the upper end of the upper portion of the housing in which the coupon is disposed, the fitting 26 together with the rod 27 and coupon and shaped charge carried on it may be removed from above the valve without loss of pressure from the line.

Alternatively, in this second described method, a welded split T of the type shown and described in United States Patent No. 3,360,284 may be used. Thus, in this latter type of T, the welds to be made in the field are removed from the immediate vicinity of the shaped charge so that the possibility of prematurely detonating the charge is remote.

From the foregoing, it will be seen that this invention is one well adapted to attain all of the ends and objects hereinabove set forth, together with other advantages which are obvious and which are inherent to the method.

It will be understood that certain features and subcombinations are of utility and may not be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described herein, what is claimed is:

1. In a method of hot tapping a pipeline or the like, the steps of attaching a part to the area of the pipeline to be tapped, arranging a saddle about said part to dispose a shaped charge carried by the saddle over and adjacent to said area, installing a housing on the pipeline to enclose the shaped charge in fluid-tight relation, establishing a connection between said housing and said part attached to the pipeline, then detonating the shaped charge to cut a coupon from said area, and then actuating the connection to withdraw the coupon and the saddle into a portion of the housing removed from said area.

2. In a method of the character defined in claim 1, the step of guiding the saddle onto the area to be tapped by aligning an opening therethrough with said part.

3. In a method of the character defined in claim 2, the steps of mounting a hollow support on the pipeline in surrounding relation to the area to be tapped, welding said support to the pipeline when the saddle is removed therefrom, and then installing the housing upon the support upon arrangement of the saddle over and adjacent said area.

4. In a method of the character defined in claim 3, including the steps of disposing a guiding member about the part attached to the housing, and guiding the hollow support onto the pipeline by aligning said support with said guiding member.

5. In a method of the character defined in claim 4, wherein the guiding member comprises a disc which is removed from about said part after guiding of the support onto the pipeline to permit said saddle to be arranged thereabout.

6. In a method of the character defined in claim 4, wherein the guiding member comprises the saddle which is removed from about said part prior to welding of said support member to the pipeline.

7. In a method of the character defined in claim 2, including the steps of mounting a hollow support on the pipeline in surrounding relation to the area to be tapped, securing the support to the pipeline while the saddle is over and adjacent the area of the pipeline to be tapped, and then installing the housing on the support.

8. In a method of the character defined in claim 7, including the step of guiding the hollow support onto the pipeline by aligning said support with said saddle.

9. In a method of hot tapping a pipeline or the like, the steps of attaching a stud to the area of the pipeline to be tapped, arranging a guiding member about the stud, guiding a hollow support over the guiding member and onto the pipeline in surrounding relation to the area, welding the support to the pipeline, then arranging a saddle about said stud to dispose a shaped charge carried by the saddle over and adjacent to said area, connecting a rod to the stud and installing a housing on the support to receive the rod and enclose the shaped charge in fluid-tight relation, then detonating the shaped charge to cut a coupon from said area, and then actuating the rod to withdraw the coupon and the saddle into a portion of the housing removed from said area.

10. In a method of hot tapping a pipeline or the like the steps of attaching a stud to the area of the pipeline to be tapped, arranging a saddle about said stud to dispose a shaped charge carried by the saddle over and adjacent to said area, guiding hollow support over the saddle and onto the pipeline in surrounding relation to the area to be tapped, securing the support to the pipeline, connecting a rod to the stud and installing a housing on the support to receive the rod and enclose the shaped charge in fluid-tight relation, then detonating the charge to cut a coupon from said area, and actuating the rod to withdraw the coupon and the saddle into a portion of the housing removed from said area.

11. In a method of hot tapping a pipeline or the like, the steps of attaching a part to the area of the pipeline to be tapped, disposing a shaped charge over and adjacent to said area, installing a housing on the pipeline to enclose the shaped charge in fluid-tight relation, establishing a connection between said housing and said part attached to the pipeline, then detonating the shaped charge to cut a coupon from said area, and then actuating the connection to withdraw the coupon into a portion of the housing removed from said area.

12. In a method of the character defined in claim 11, the step of guiding the shaped charge onto the area to be tapped by aligning an opening therethrough with said part.

13. In a method of the character defined in claim 12, the steps of mounting a hollow support on the pipeline in surrounding relation to the area to be tapped, welding said support to the pipeline when the shaped charge is removed therefrom, and then installing the housing upon the support upon arrangement of the shaped charge over and adjacent said area.

14. In a method of the character defined in claim 13, including the steps of disposing a guiding member about the part attached to the housing, and guiding the hollow support onto the pipeline by aligning said support with said guiding member.

15. In a method of the character defined in claim 14, wherein the guiding member comprises a disc which is removed from about said part after guiding of the support onto the pipeline to permit said shaped charge to be arranged thereabout.

16. In a method of the character defined in claim 14, wherein the guiding member comprises the shaped charge which is removed from about said part prior to welding of said support member to the pipeline.

17. In a method of the character defined in claim 12, including the steps of mounting a hollow support on the pipeline in surrounding relation to the area to be tapped, securing the support to the pipeline while the shaped charge is over and adjacent the area of the pipeline to be tapped, and then installing the housing on the support.

18. In a method of the character defined in claim 17, including the step of guiding the hollow support onto the pipeline by aligning said support with said shaped charge.

19. In a method of hot tapping a pipeline or the like, the steps of attaching a stud to the area of the pipeline to be tapped, arranging a guiding member about the stud, guiding a hollow support over the guiding member and onto the pipeline in surrounding relation to the area, welding the support to the pipeline, then disposing a shaped charge over and adjacent to said area, connecting a rod to the stud and installing a housing on the support to receive the rod and enclose the shaped charge in fluid-tight relation, then detonating the shaped charge to cut a coupon from said area, and then actuating the rod to withdraw the coupon into a portion of the housing removed from said area.

20. In a method of hot tapping a pipeline or the like, the steps of attaching a stud to the area of the pipeline to be tapped, disposing a shaped charge over and adjacent to said area, guiding a hollow support over the shaped charge and onto the pipeline in surrounding relation to the area to be tapped, securing the support to the pipeline, connecting a rod to the stud and installing a housing on the support to receive the rod and enclose the shaped charge in fluid-tight relation, then detonating the charge to cut a coupon from said area, and actuating the rod to withdraw the coupon into a portion of the housing removed from said area.

References Cited

UNITED STATES PATENTS 3,396,745  8/1968  Bates _____ 137—317

ALAN COHAN, Primary Examiner

U.S. Cl. X.R.

137—318, 324